United States Patent [19]
Muramatsu et al.

[11] Patent Number: 5,939,623
[45] Date of Patent: Aug. 17, 1999

[54] SCANNING TYPE NEAR FIELD INTERATOMIC FORCE MICROSCOPE

[75] Inventors: Hiroshi Muramatsu; Takeshi Umemoto, both of Chiba, Japan

[73] Assignee: Seiko Instruments Inc., Japan

[21] Appl. No.: 08/764,214

[22] Filed: Dec. 13, 1996

[30] Foreign Application Priority Data

Feb. 20, 1996 [JP] Japan .................................. 8-032396

[51] Int. Cl.⁶ .............................. G01B 7/34; G02B 21/00
[52] U.S. Cl. .......................................................... 73/105
[58] Field of Search ............................... 73/105; 250/306

[56] References Cited

U.S. PATENT DOCUMENTS

| | | | |
|---|---|---|---|
| 5,254,854 | 10/1993 | Betzig | 250/306 X |
| 5,304,795 | 4/1994 | Fujihira et al. | 250/306 X |
| 5,354,985 | 10/1994 | Quate | 250/234 |
| 5,389,779 | 2/1995 | Betzig et al. | 250/306 X |
| 5,513,168 | 4/1996 | Fujihira et al. | 250/306 X |
| 5,548,113 | 8/1996 | Goldberg et al. | 250/306 X |
| 5,627,365 | 5/1997 | Chiba et al. | 73/105 X |
| 5,641,896 | 6/1997 | Karrai | 73/105 |

FOREIGN PATENT DOCUMENTS

| | | | |
|---|---|---|---|
| 290647A1 | 11/1988 | European Pat. Off. | |
| 388023A2 | 9/1990 | European Pat. Off. | |
| 622652 | 11/1994 | European Pat. Off. | 73/105 |
| 701102A1 | 3/1996 | European Pat. Off. | |

OTHER PUBLICATIONS

Betzig et al., "Combined Shear Force and Near–Field Scanning Optical Microscopy", Appl. Phys. Lett., vol. 60, No. 20, May 18, 1992, pp. 2484–2486.

van Hulst et al., "Operation of a Scanning Near Field Optical Microscope in Reflection in Combination with a Scanning Force Microscope", SPIE vol. 1639 Scanning Probe Microscopies, 1992, pp. 36–42.

Muramatsu et al., "Near–Field Optical Microscopy in Liquids", Appl. Phys. Lett., vol. 66, No. 24, Jun. 12, 1995, pp. 3245–3247.

Shalom et al., "A Micropipette Force Probe Suitable for Near–Field Scanning Optical Microscopy", Review of Scientific Instruments, vol. 63, No. 09, Sep. 1992, pp. 4061–4065.

Toledo–Crow et al., "Near–Field Differential Scanning Optical Microscope with Atomic Force Regulation", Appl. Phys. Lett., vol. 60, No. 24, Jun. 15, 1992, pp. 2957–2959.

Applied Physics Letters, vol. 66, No. 14, Apr. 3, 1995, pp. 1842–1844, Khaled Karrai et al., "Piezoelectric Tip–Sample Distance Control for Near Field Optical Microscope".

*Primary Examiner*—Daniel S. Larkin
*Attorney, Agent, or Firm*—Adams & Wilks

[57] ABSTRACT

A scanning type near field interatomic force microscope of the type having a hook-shaped probe formed of a light transmitting material and having a sharpened tip portion with a transmitting hole for transmitting light, the probe being disposed over and moved relative to a sample surface for simultaneously measuring the shape of the surface of the sample and the optical characteristics of a minute region of the surface of the sample by scanning over the surface of the sample under a state in which the distance between the tip portion of the probe and the surface of the sample is within an operation distance in which an interatomic force acts between the tip portion of the probe and the surface of the sample. A quartz oscillator is attached to a shaft portion of the probe and has electrodes. A detection circuit detects a change in the resonance characteristics of the oscillator caused by the interatomic force acting between the tip portion of the probe and the surface of the sample. An XYZ scanner is used for maintaining a constant distance between the tip portion of the probe and the surface of the sample on the basis of a detection signal outputted from the detection circuit.

22 Claims, 9 Drawing Sheets

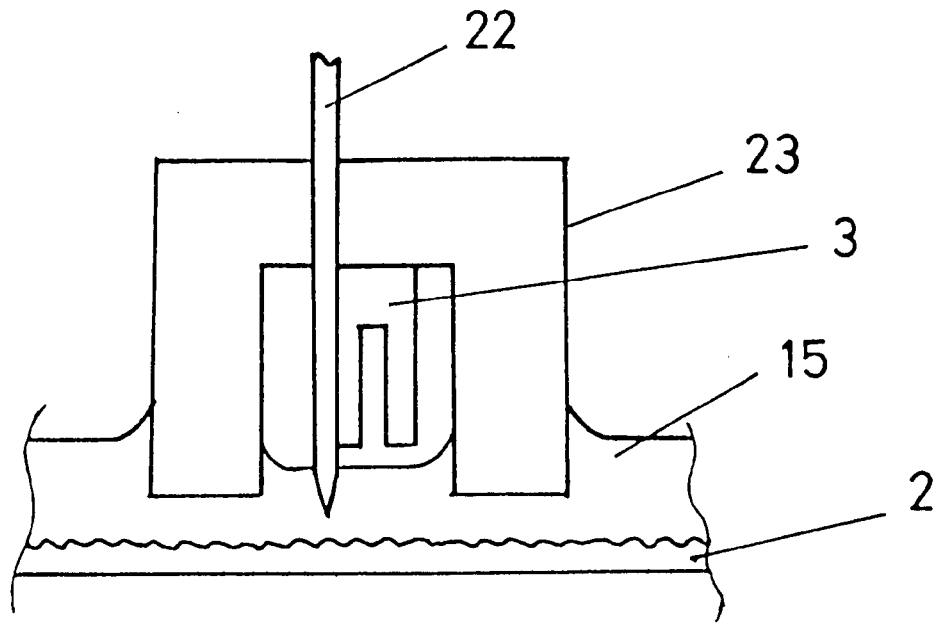
F I G. 7
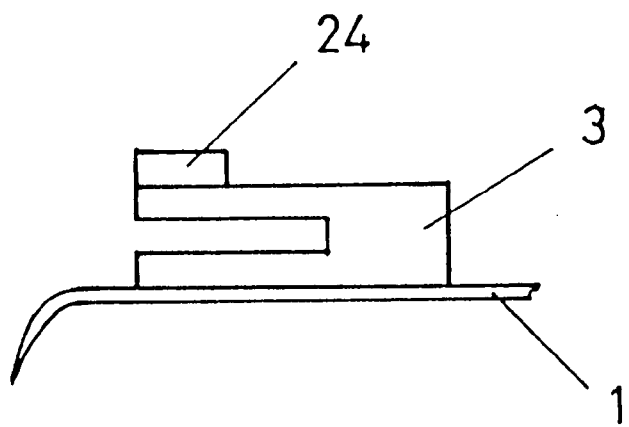
F I G. 8

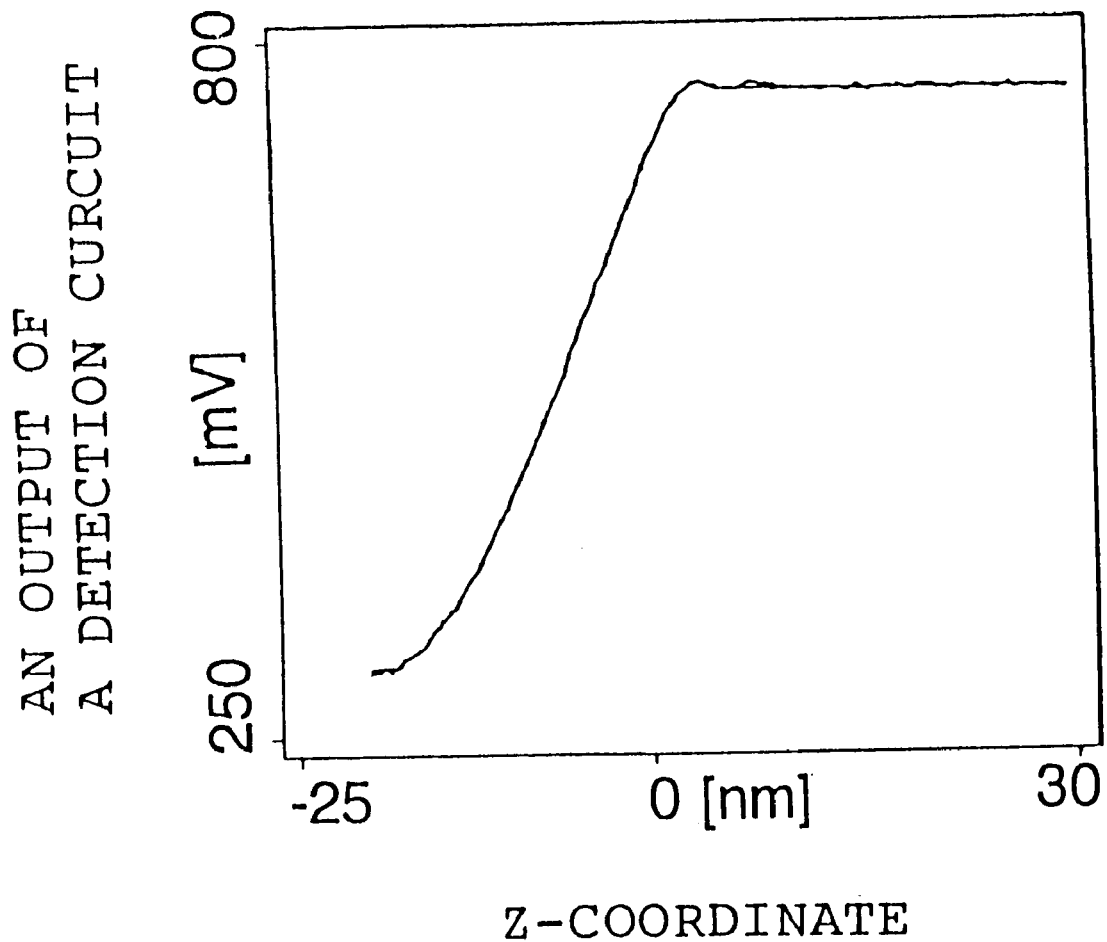
F I G. 1 1

SCANNING TYPE NEAR FIELD INTERATOMIC FORCE MICROSCOPE

BACKGROUND OF THE INVENTION

The present invention relates to a scanning type near field interatomic force microscope which observes the surface shape of a substance to be measured by using an interatomic force acting between substances and which at the same time, observes optical characteristics of the substance to be measured in a minute region by a probe made of a light transmitting material.

In a conventional scanning type near field interatomic force microscope, as shown in FIG. 3, a shaft portion of a hook-shaped probe 1 of a light transmitting material is used as a cantilever. The light emitted from an optical source 8 passes through the probe 1, which formed of an optical fiber, and is made to irradiate a sample 2 from the tip thereof. The transmitting light influenced by the optical characteristics of the sample 2 is detected by an optical detector 11 through an objective lens 9 and a reflecting mirror 10. The relative movement between the probe 1 and the sample 2 is performed by an XYZ scanner 12.

The probe 1 is attached to a bimorph 4 for oscillating the tip of the probe 1 in the vertical direction. This is done to prevent the tip of the probe 1 and the surface of the sample 2 from being seriously damaged by the roughness of the surface of the sample 2 when the probe 1 is made to scan the surface of the sample 2 in the horizontal direction.

The bending of the cantilever caused by the interatomic force acting between the tip of the probe 1 and the surface of the sample 2 is detected by a displacement magnifying mechanism comprising an optical lever system 14 by using an optical reflector provided on a portion of the cantilever of the probe 1.

The XYZ scanner 12, bimorph 4, and optical lever system 14 are controlled by a controller 13. Such a scanning type near field interatomic force microscope is disclosed in Japanese Laid-Open Patent Publication No. Hei. 7-174542.

On the other hand, there is a system in which such a cantilever is assembled in a quartz oscillator and the interatomic force is detected by the shift of a resonance frequency of the quartz oscillator, and such an interatomic force microscope is, for example, disclosed in Japanese Laid-Open Patent Publication No. Sho. 63-309803 and No. Hei. 4-102008.

Further, in the field of a near field microscope, there is known a system in which a linear optical fiber having a sharpened tip is used as a probe, and measurement is conducted in the state where the tip of the probe attached to a quartz oscillator is vibrated in parallel with the surface of the sample.

In the conventional scanning type near field interatomic force microscope using light to detect the bending of the cantilever, it must be avoided that the detecting light affects the near field optical measurement. For that purpose, it is necessary to make the wavelength region of the detecting light for detecting the bending of the cantilever differ from the wavelength region of the measuring light used in the near field optical measurement. This is a limitation to the near field optical measurement and mounting of a microscope device.

Further, in the near field optical measurement to detect faint light passing through a minute opening, it is sometimes difficult to avoid the influence of the detecting light for detecting the bending of the probe.

In addition, there is a problem in that the optical system for detecting the bending of the cantilever occupies a part of the space around the probe, so that the arrangement of an optical system for near field optical measurement in a reflecting mode is limited.

Further, in the conventional device, the optical axis of the detecting light for detecting the bending of the cantilever must be aligned with the optical reflector of the cantilever, or the alignment of optical detecting elements must be conducted, that is, the troublesome adjustment operations must be made in order to carry out the measurement.

On the other hand, in the system in which the linear optical fiber probe having a sharpened tip is attached to the quartz oscillator and measurement is carried out in the state that the tip of the probe is made to vibrate in parallel with the surface of the sample, there is a defect in that when a very rough sample is measured, the tip of the probe is apt to be damaged. Further, there is a defect in that the space above the surface of the sample is occupied by the quartz oscillator for oscillating the probe, so that the conventional system is disadvantageous in reflective measurement and observation for positioning of the sample.

SUMMARY OF THE INVENTION

It is an object of the invention to provide a scanning type near field interatomic force microscope without an optical system used for measuring the bending of a cantilever.

Another object of the invention is to provide a scanning type near field interatomic force microscope having a freedom with respect to the arrangement of an optical system for near field optical measurement.

A further object of the invention is to provide a scanning type near field interatomic force microscope which has a miniaturized measurement system so that measurement in a specific enviroment such as in a liquid, vacuum, or a low temperature container becomes easy to achieve.

BRIEF DESCRIPTION OF THE DRAWINGS

FIG. 7 is a schematic view showing another embodiment of measurement in a liquid by the scanning type near field interatomic force microscope of the present invention;

FIG. 8 is a view showing an embodiment of a probe system of the scanning type near field interatomic force microscope of the present invention;

FIG. 11 is a view showing an approach curve of the probe of the second embodiment of the scanning type near field interatomic force microscope of the present invention.

DETAILED DESCRIPTION OF THE PREFERRED EMBODIMENTS

In order to solve the above-mentioned problems, the present invention is configured such that in a scanning type near field interatomic force microscope, a shaft portion of a hook-shaped probe is attached to a side surface of a quartz oscillator. The direction of attaching the probe is such that when the quartz oscillator oscillates, the vibration direction of the tip of the probe becomes the direction in which the tip of the probe is directed. Further, the attachment position is configured such that the intrinsic frequency of the tip portion of the probe protruding from the quartz oscillator does not become lower than the oscillation frequency of the quartz probe.

The quartz oscillator to which the probe is attached, is made to oscillate at a resonance frequency when the tip of the probe is sufficiently remote from the surface of the sample. When the probe is made to approach the surface of the sample under the state where the tip of the probe oscillates in the vertical direction with respect to the surface of the sample, the interatomic force acts between the tip of the probe and the surface of the sample, and the resonance frequency of the quartz oscillator is changed by this force. This change of the resonance characteristics is detected by measuring a current or voltage between electrodes provided on the quartz oscillator.

In order to oscillate the quartz oscillator, there is a method of oscillating the quartz oscillator itself by applying an AC voltage between electrodes of the quartz oscillator. In this case, by measuring the current flowing between the electrodes of the quartz oscillator, the resonance characteristics of the quartz oscillator can be detected.

As another method of oscillating the quartz oscillator, it is also possible to oscillate the quartz oscillator from the outside by using a bimorph element. In this case, if the electromotive force (electric charge) generated in the electrodes of the quartz oscillator is measured, the resonance characteristics of the quartz oscillator can be measured.

Figure 1:
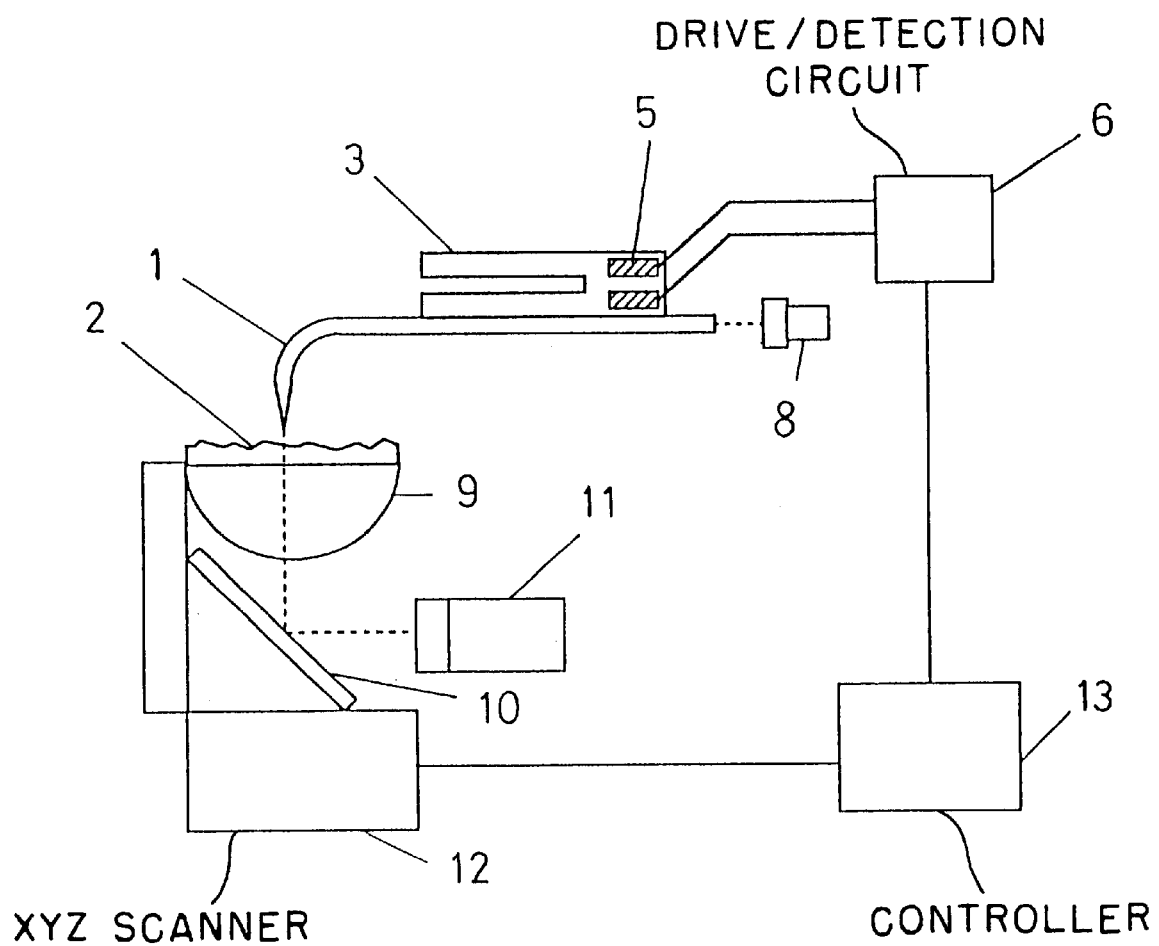
FIG. 1 is a schematic view showing a first embodiment of a scanning type near field interatomic force microscope of the present invention.

FIG. 1 shows a first embodiment of a scanning type near field interatomic force microscope of the present invention. A probe 1 is attached to the side surface of a quartz oscillator 3. The quartz oscillator 3 is of a tuning fork type quartz oscillator used in a quartz clock, and has a resonance frequency of 32.768 kHz in a state where the probe is not attached.

The probe 1 is a hook-shaped probe for a scanning type near field interatomic force microscope, which has a sharpened tip portion with a minute transmitting hole for transmitting light. The probe 1 is formed by processing an optical fiber. The probe 1 is attached to the quartz oscillator 3 so that the direction of the tip of the probe 1 is the same as that of oscillation of the quartz oscillator 3.

A pair of electrodes 5 provided on the quartz oscillator 3 are connected to a drive/detection circuit 6 for the quartz oscillator 3. The drive/detection circuit 6 oscillates the quartz oscillator 3 by applying an AC electric field between the electrodes 5 and measures the resonance characteristics of the quartz oscillator 3 by detecting a current flowing between the electrodes The light for measuring the characteristics of a sample 2 in a near field is emitted from an optical source 8, passes through the probe 1 formed of the optical fiber, and is made to irradiate from the tip of the probe. In the case where the sample 2 has a transparent substance, as shown in FIG. 1, the light influenced by the optical characteristics of the sample 2, as transmitting light, is detected by an optical detector 11 through an objective lens 9 and a reflecting mirror 10. The relative movement between the probe 1 and the sample 2, such as scanning of the probe 1 on the surface of the sample 2, is carried out by an XYZ scanner 12. The XYZ scanner 12 and the drive/detection circuit 6 are controlled by a controller 13.

Figure 9:
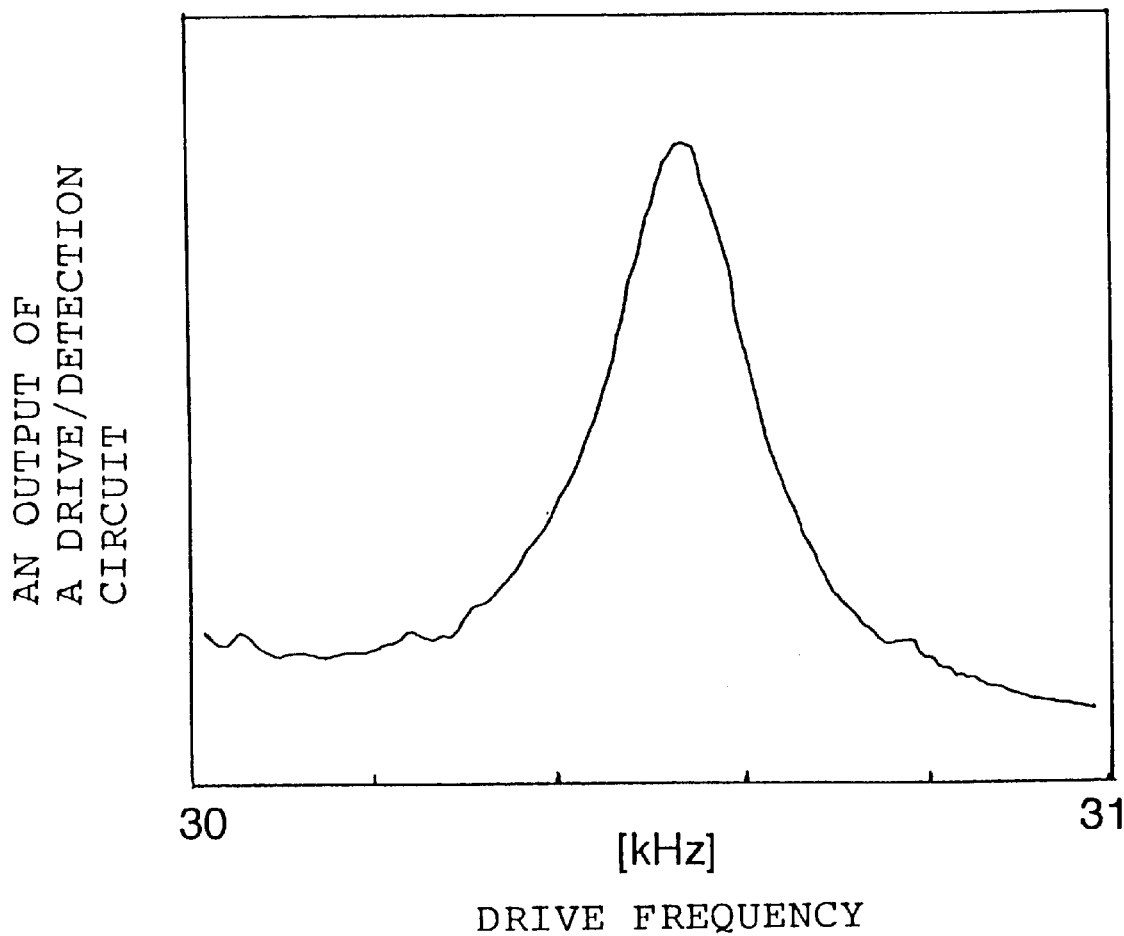
FIG. 9 is a view showing a measurement example of resonance characteristics of a probe of the first embodiment of the scanning type near field interatomic force microscope of the present invention in air.

FIG. 9 shows the resonance characteristics of the probe 1 measured when the quartz oscillator 3 is driven by a voltage of 1V. The horizontal axis of the abscissa indicates a drive frequency for the quartz oscillator, and the axis of the ordinate indicates an output of the drive/detection circuit 6. The Q-value of the probe 1 obtained from this measurement example was 184.

Figure 2:
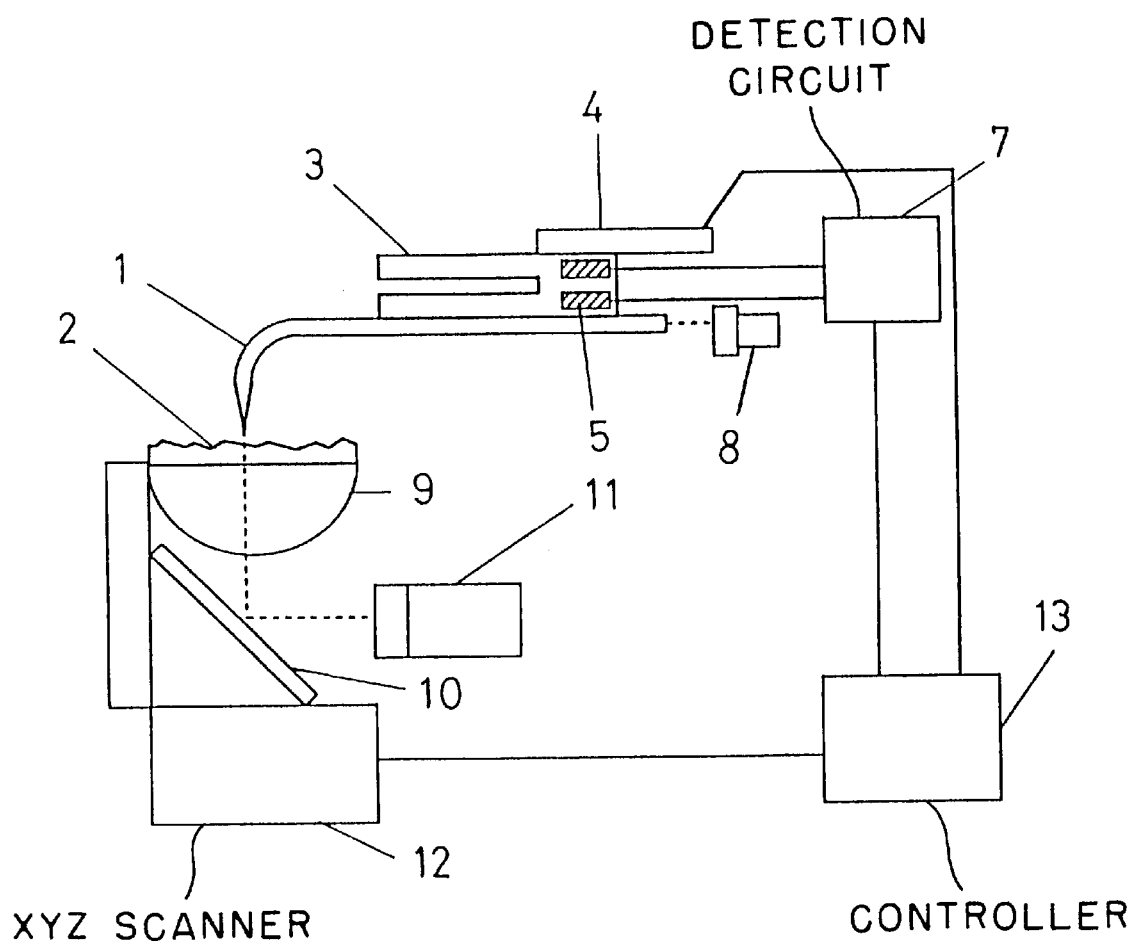
FIG. 2 is a schematic view showing a second embodiment of a scanning type near field interatomic force microscope of the present invention.
Figure 3:
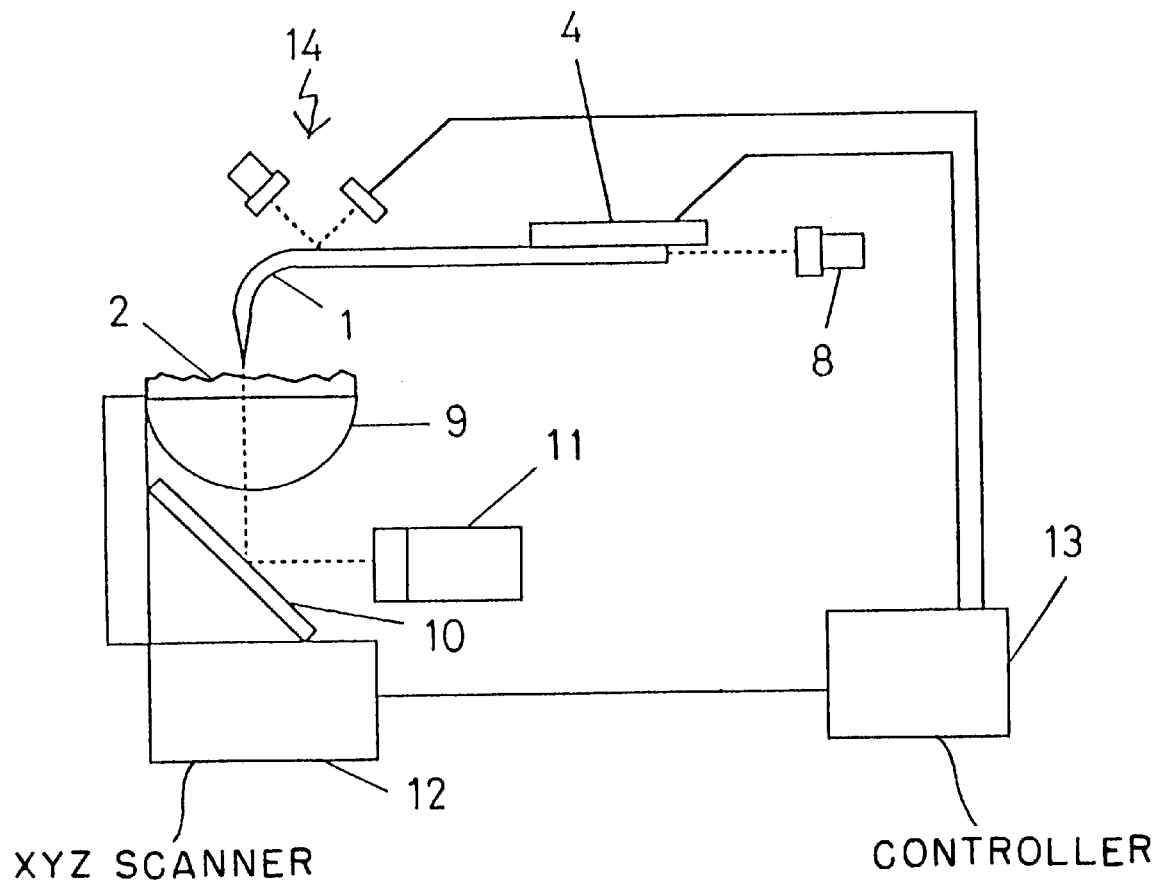
FIG. 3 is a schematic view showing a conventional scanning type near field interatomic force microscope.

FIG. 2 shows a second embodiment of a scanning type near field interatomic force microscope of the present invention. The same reference numerals are used in FIGS. 1 and 2 as in FIG. 2 to denote the same or similar structure. Similar to the first embodiment, a probe 1 is attached to the side surface of a quartz oscillator 3. Contrary to the first embodiment, the quartz oscillator 3 is attached to a bimorph 4, and the bimorph 4 oscillates the quartz oscillator 3 to which the probe 1 is attached. A pair of electrodes 5 provided on the quartz oscillator 3 are connected to a detection circuit 7. The detection circuit 7 detects electric charges which are generated between the electrodes 5 by the oscillation of the quartz oscillator 3 caused by the bimorph 4, so that the detection circuit measures the resonance characteristics of the quartz oscillator 3. The controller 13 is electrically connected to the detection circuit 7, the bimorph 4 and the XYZ scanner 12.

Figure 10:
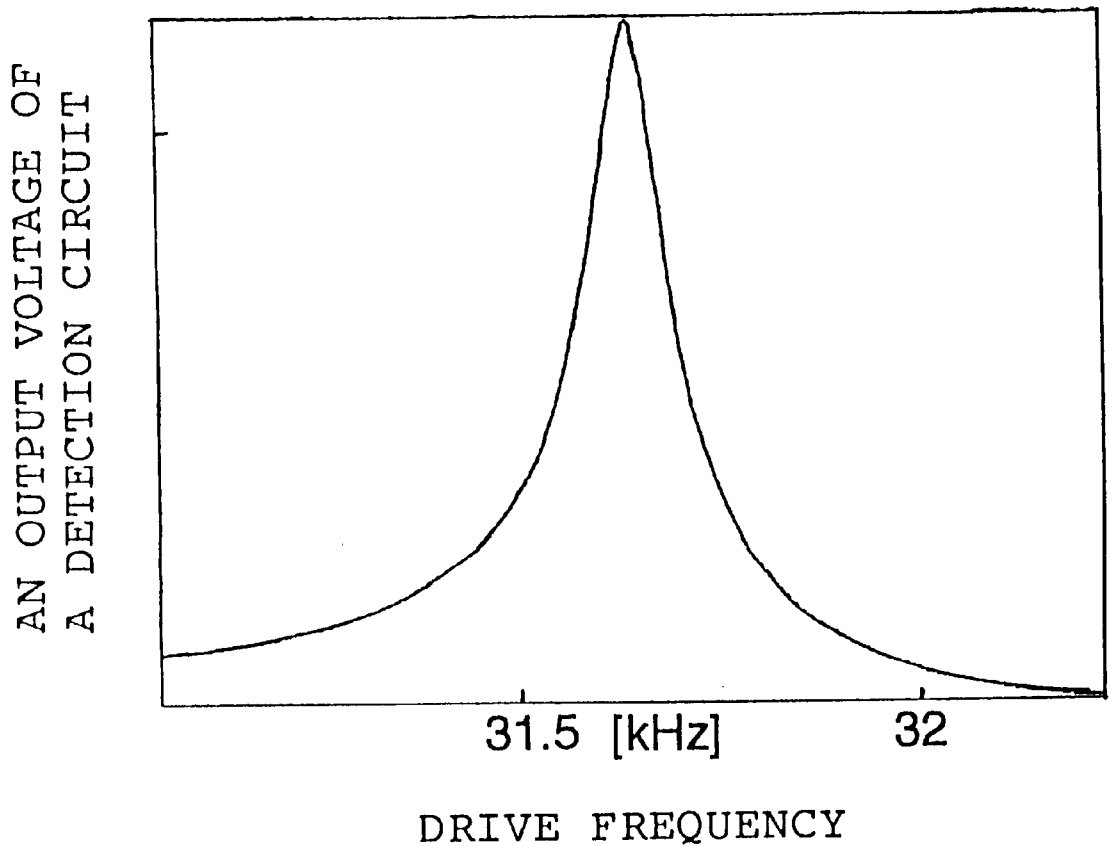
FIG. 10 is a view showing a measurement example of resonance characteristics of a probe of the second embodiment of the scanning type near field interatomic force microscope of the present invention in air.

FIG. 10 shows the resonance characteristics of the probe 1 which was measured when the bimorph 4 is driven by a voltage of 1V. The axis of abscissa indicates a drive frequency for the bimorph 4, and the axis of ordinate indicates an output voltage from the detection circuit 7. The Q-value of the probe 1 obtained by this measurement example is 360.

FIG. 11 shows the measurement result of the change of output values of the detection circuit 7 when the probe 1 is made to approach the surface of the sample 2 under the state where the probe 1 is oscillated at the resonance point. The sensitivity of the probe 1 in a Z-direction may be determined from this measurement. In this measurement example, when the noise is 1 mV P—P, the sensitivity of the probe 1 in the Z-direction was 25 mV/nm. In a conventional device using an optical lever, when the noise is 1 mV P—P like the former measurement example, the sensitivity in the Z-direction is normally about 10 mV/nm, which indicates that the invention has a sensitivity superior to that of the conventional optical lever.

In the above described embodiments, it is possible to control a distance between the tip of the probe and the surface of the sample by detecting the change in strength of output signals while the oscillating frequency is fixed. Further, it is also possible to provide Z-axis control by comparing the phases of the oscillating signal and the detected signal with each other, making the oscillating signal to follow the resonance frequency of the probe, and detecting the frequency change.

According to the probe of the present invention, by immersing only the tip of the probe and the surface of the sample into a liquid while preventing the liquid from sticking to the electrodes of the quartz oscillator and wiring portions, measurement in the liquid environment can be made. In the case where the affinity between the surface of the sample and the liquid is low, when a small amount of liquid is put on the surface of the sample, it becomes a state that it is kept in the shape of a drop of liquid. When measurement is carried out, the measurement in the liquid environment can me made by establishing the state in which only the tip of the probe is immersed in the liquid.

The measurement in the liquid environment can be carried out by making a fence-like barrier around on the circumference of the surface of the sample, filling a liquid in the fence, providing a gap in a part of the fence, and inserting the tip of the probe into the barrier through the gap. Since the probe is sufficiently thin, it is possible to make the gap thin so that the liquid does not leak from the gap by virtue of the surface tension.

Further, measurement in a liquid can be achieved by providing a half sealing cover so that an air layer is formed at the portion of the quartz oscillator even if the entire probe is immersed in the liquid.

Figure 12:
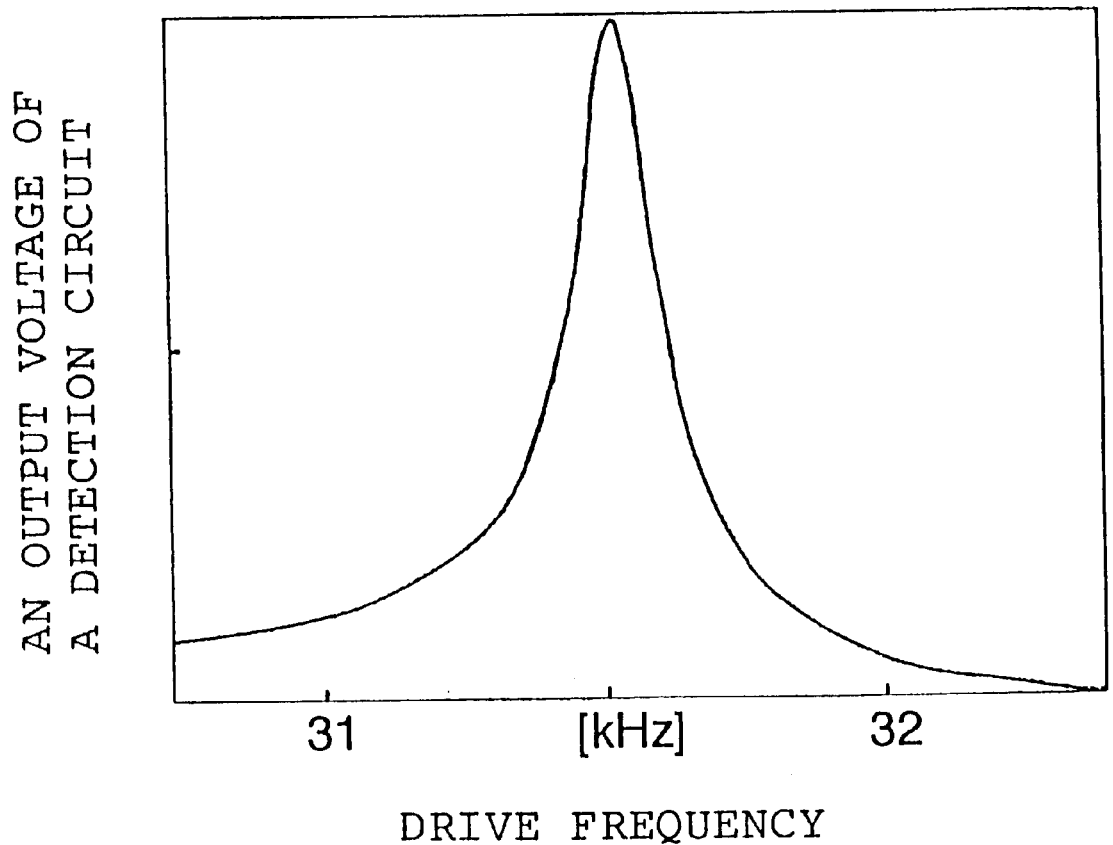
FIG. 12 is a view showing a measurement example of resonance characteristics of the probe of the second embodiment of the scanning type near field interatomic force microscope of the present invention in water.

FIG. 12 shows an example of resonance characteristics which were measured in the state where the tip of the probe 1 is immersed in a liquid according to the second embodiment of the scanning type near field interatomic force microscope of the present invention. The Q-value at this time was 260. Although it was slightly reduced as compared with the Q-value obtained in the measurement in the air as shown in FIG. 10, the shape of the surface of the sample could be more readily measured. Measuring the sample in the liquid in this way is an indispensable element for measuring the surface shape and optical characteristics of a living substance such as a microorganism or a cell, or a high molecular material while it is in the active state.

Figure 4:
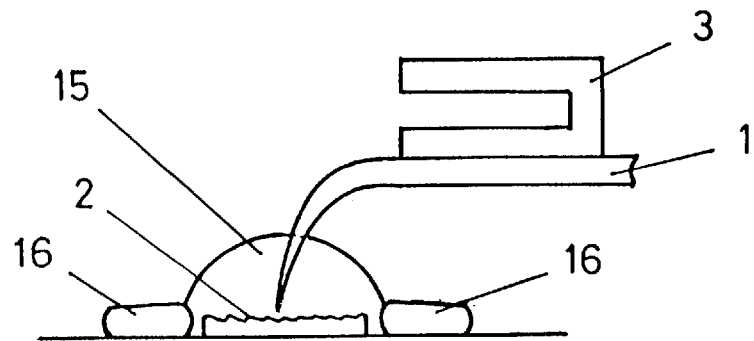
FIG. 4 is a schematic view showing an embodiment of measurement in a liquid by the scanning type near field interatomic force microscope of the present invention.

FIG. 4 shows an example according to a measurement in a liquid. A lyophobic ring sheet 16 is put on a sample stand, and in the state where a liquid 15 is kept in the shape of a drop of liquid on the surface of the sample 2, the tip of the probe 1 attached to the quartz oscillator 3 is immersed in the liquid to carry out measurement. In the case where the liquid is not volatile, the drop of liquid is sufficiently stable during the measurement.

Figure 5:
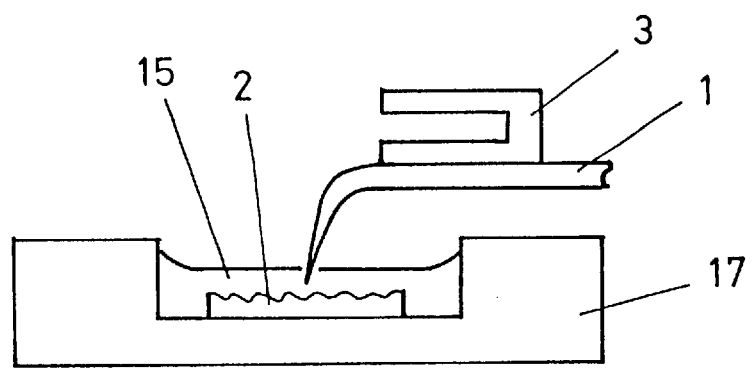
FIG. 5 is a schematic view showing another embodiment of measurement in a liquid by the scanning type near field interatomic force microscope of the present invention.

As shown in FIG. 5, if the sample 2 is put in a container 17 capable of keeping the liquid 15, it is also possible to carry out the measurement in the liquid. The depth of the liquid layer on the surface of the sample is determined by the depth of the container 17 and the thickness of the sample 2. The depth of the liquid can be adjusted so that even if the probe 1 is made to approach the surface of the sample 2 at the measurement time, the quartz oscillator 3 is not brought into contact with the liquid 15. According to this, the measurement in the liquid can be carried out even in the case where the liquid has an affinity to the surface of the sample so that the drop of liquid is not formed. Also, since a larger amount of liquid than the drop of liquid can be used, even if a volatile liquid is used, stable measurement can be made for a longer time.

Figure 6:
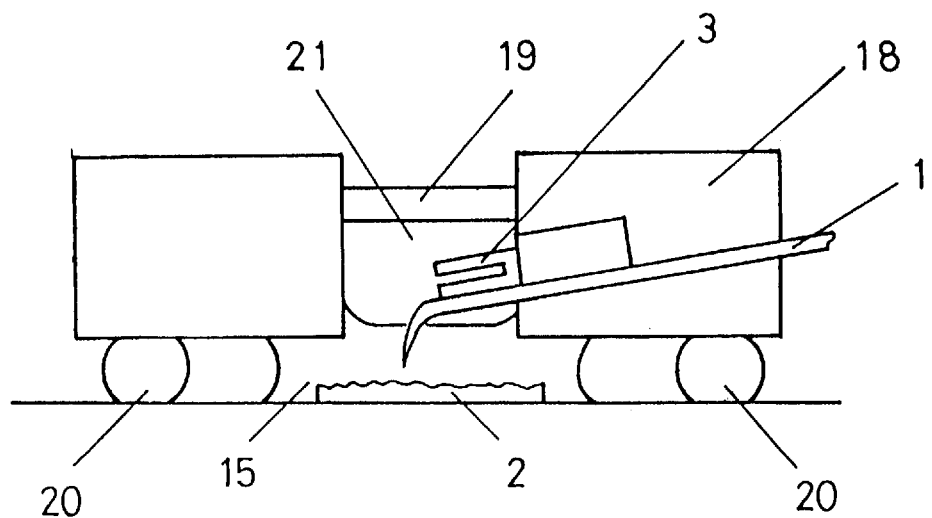
FIG. 6 is a schematic view showing another embodiment of measurement in a liquid by the scanning type near field interatomic force microscope of the present invention.

Further, as shown in FIG. 6, if a cover 18 covering a top and a side surface of the probe 1 is provided and the probe system is made to cover the sample 2 put in the liquid 15 so that although the tip of the probe 1 is immersed in the liquid 15, the quartz oscillator 3 is placed in an air layer 21 in the cover 18, the measurement in the liquid can be carried out. The cover 18 may be provided with a transparent window 19 so that the sample 2 can be observed from the above, reflective measurement light can be taken out, or outside illumination can be introduced. Further, if the circumference of the sample 2 is sealed by an oil seal 20, it is possible to prevent the liquid from decreasing due to evaporation thereof so that the measurement for a long time can be carried out in a stable manner.

Also, in the structure in which a cover 23 is attached to the probe, the measurement in the liquid can be made also in a share force type scanning type near field interatomic force microscope in which a linear probe 22 is used as shown in FIG. 7, and the tip of the linear probe is made to oscillate in the horizontal direction with respect to the surface of the sample 2 to detect the interatomic force.

In the above described embodiments, as the quartz oscillator, a ready-made article used as a clock frequency generator of a watch can be used. In general, the quartz oscillator is widely used for the use of a watch or a communication equipment, the manufacturing method thereof is established, and the element can be obtained at a low cost. If such a ready-made article is used for the probe of the scanning type near field interatomic force microscope, the probe can be produced at a low cost. Further, it is also possible to newly produce the quartz oscillator designed for the exclusive use of the scanning type near field interatomic force microscope in accordance with the characteristics such as a spring constant of the cantilever, a resonance frequency, and a Q-value.

The spring constant as the cantilever of the probe with the quartz oscillator used in the above-mentioned embodiments is 2, 500 N/m. Although this probe can be used to measure a hard sample such as an inorganic substance without any problems, as for a soft sample such as a living substance or a high molecule, if the spring constant is made smaller, the danger of damaging the tip of the probe can be lessened at the measurement. Since the spring constant is determined by the shape of the quartz oscillator, the quartz oscillator having a smaller spring constant maybe designed by making the thickness thin and the length long.

Similarly, although the resonance frequency of the quartz oscillator used in the above-mentioned embodiments is about 32.7 kHz, the resonance frequency can be designed as a different value by changing the outer shape of the quartz oscillator and the arrangement of the electrodes. If the quartz oscillator having a higher resonance frequency (for example, 400 kHz) is formed, the measuring speed can be increased so that the measuring time can be shortened.

Although the tuning fork type quartz oscillator has originally a Q-value of about 10,000 for resonance in air in the state where the probe is not attached, the Q-value in the above described embodiments is decreased to about 300 since the probe is attached to one side of the quartz oscillator. However, as shown in FIG. 8, with expecting that the probe 1 is attached to one side of the quartz oscillator 3, if a balance weight 24 is attached to the other side thereof, the probe having a higher Q-value can be formed so that the detection sensibility can be increased. This method can be similarly applied also to the share force type scanning type near field interatomic force microscope.

Although the present invention has been described on the basis of various embodiments, it is needless to say that the present invention is not limited to these embodiments. Especially, with respect to a piezoelectric substance, although the tuning type quartz oscillator which is cheap and easily obtained is selected in the above embodiments, for example, the shape may be rod-shape, plate-shape, or cylinder-shape other than the tuning fork type. In principle, the shape thereof does not matter if it can oscillate the probe. Also, the material of the oscillator is not limited to the quartz. Any material exhibiting the piezoelectricity such as ZnO (zinc oxide), PZT (zircon/titanate) or a piezoelectric high molecular material may be applied similarly to the above-mentioned embodiments.

The present invention is practiced as in the embodiments described above, and has effects as set forth below. A probe is attached to a piezoelectric substance, and an interatomic force acting between the tip end of the probe and the surface of a sample is detected through a signal from electrodes provided on the piezoelectric substance, so that an optical system conventionally used for measurement of bending of a cantilever becomes unnecessary, whereby there are removed the restriction to a wavelength region for near field optical measurement, and the influence that an optical signal for bending measurement appears as noise in a signal of the near field optical measurement. Also, a troublesome operation such as alignment of an optical axis of detecting light for bending detection becomes unnecessary so that the measurement becomes easy.

Further, since the place where the optical system used for the measurement of bending of the cantilever becomes empty, the freedom with respect to the arrangement of an optical system for the near field optical measurement is increased.

Since the entire of a measurement system including the probe can be miniaturized, the measurement in a specific environment such as in a liquid, vacuum, or a low temperature container becomes easier than a conventional system.

What is claimed is:

1. An atomic force microscope comprising: a cantilever type probe having a sharpened tip portion movable relative to a sample surface for measuring the shape of the sample surface by scanning the tip portion relative to the sample surface while maintaining the distance between the probe tip and the sample surface within a range in which an interatomic force acts between the probe tip and the sample surface; a piezoelectric substance attached to the probe and having electrodes; oscillating means for oscillating the piezoelectric substance at a natural resonance frequency thereof; detecting means for detecting a change in resonance characteristics of the piezoelectric substance caused by the interatomic force as a change in electrical characteristics of the piezoelectric substance and outputting a corresponding detection signal; and control means for maintaining the distance between the probe tip and the sample surface constant based on the detection signal; wherein the piezoelectric substance comprises a tuning fork type quartz oscillator having a first arm attached to the probe and a second arm attached to a balance weight.

2. An atomic force microscope according to claim 1; wherein the oscillating means comprises a drive circuit for generating an AC drive signal to drive the piezoelectric substance, and the detecting means includes means for detecting through the electrodes a change in current of the AC drive signal caused by the interatomic force.

3. An atomic force microscope according to claim 1; wherein the oscillating means comprises a bimorph for oscillating the piezoelectric substance in response to an externally supplied signal, and the detecting means includes means for detecting a change in voltage across the electrodes in response to oscillation of the piezoelectric substance and the interatomic force.

4. An atomic force microscope according to claim 1; wherein the detecting means comprises means for controlling the frequency of an oscillating signal of the oscillating means so as to follow a resonance frequency of the piezoelectric substance by comparing a phase of the oscillating signal to a phase of an electrical signal detected through the electrodes of the piezoelectric substance, the detecting means includes means for outputting the detection signal by detecting the change in a resonance frequency caused by the action of the interatomic force, and the control means includes means for controlling the resonance frequency of the piezoelectric substance to be constant so that the distance between the tip portion of the probe and the surface of the sample is kept constant.

5. An atomic force microscope according to claim 1; further comprising a lyophobic ring sheet for holding a drop of liquid on the sample surface such that measurement of the sample surface may be conducted in a liquid environment by immersing the tip portion of the probe in the drop of liquid.

6. An atomic force microscope according to claim 1; further comprising a sample container enclosing the sample and holding a liquid such that measurement of the sample surface may be conducted in a liquid environment by immersing the tip portion of the probe in the liquid.

7. An atomic force microscope according to claim 1; further comprising a cover for covering the probe and a top and a side surface of the piezoelectric substance such that measurement of the sample surface may be conducted in a liquid environment by immersing the probe tip in a liquid filling the surface of the sample such that the piezoelectric substance is located outside the liquid.

8. An atomic force microscope according to claim 1; wherein the tip portion of the probe is hook-shaped and the piezoelectric substance oscillates in a direction substantially perpendicular to a surface plane of the sample.

9. An atomic force microscope comprising: a hook-shaped probe formed at least partially of a light transmitting material and having a sharpened tip portion with a transmitting hole for transmitting light and a shaft portion extending at an angle with respect to the tip portion, the probe being disposed over and movable across a sample surface for simultaneously measuring the shape of the sample surface and the optical characteristics of a minute portion of the sample surface by scanning the tip portion of the probe relative to the sample surface while maintaining the distance between the tip portion and the sample surface within a range in which an interatomic force acts between the tip portion and the sample surface; a piezoelectric substance attached to the shaft portion of the probe such that the tip portion extends in a direction of oscillation of the piezoelectric substance; a pair of electrodes formed on the piezoelectric substance; oscillating means for oscillating the piezoelectric substance at a resonance frequency thereof and in a direction approximately perpendicular to the surface plane of the sample; detecting means for detecting a change in resonance characteristics of the piezoelectric substance caused by the interatomic force by measuring a change in the electrical characteristics of the piezoelectric substance and outputting a corresponding detection signal; and control means for maintaining a constant distance between the tip portion of the probe and the sample surface on the basis of the detection signal; wherein the piezoelectric substance comprises a tuning fork type quartz oscillator, the probe is attached to one arm of the tuning fork type quartz oscillator, and a balance weight for balancing against the probe is attached to the other arm.

10. An atomic force microscope according to claim 9; wherein the oscillating means comprises a drive circuit for generating an AC drive signal to drive the piezoelectric substance, and the detecting means includes means for detecting through the electrodes a change in current of the AC drive signal caused by the interatomic force.

11. An atomic force microscope according to claim 9; wherein the oscillating means comprises a bimorph for oscillating the piezoelectric substance in response to an externally supplied signal, and the detecting means includes means for detecting a change in voltage across the electrodes in response to oscillation of the piezoelectric substance and the interatomic force.

12. An atomic force microscope according to claim 9; wherein the detecting means comprises means for controlling the frequency of an oscillating signal of the oscillating means so as to follow a resonance frequency of the piezoelectric substance by comparing a phase of the oscillating signal to a phase of an electrical signal detected through the electrodes of the piezoelectric substance and means for outputting the detection signal by detecting the change in resonance frequency caused by the interatomic force, and the control means includes means for controlling the resonance frequency of the piezoelectric substance to be constant so that the distance between the tip portion of the probe and the surface of the sample is kept constant.

13. An atomic force microscope according to claim 9; further comprising a lyophobic ring sheet for holding a drop of liquid on the sample surface such that measurement of the sample surface may be conducted in a liquid environment by immersing the tip portion of the probe in the drop of liquid.

14. An atomic force microscope according to claim 9; further comprising a sample container enclosing the sample and holding a liquid such that measurement of the sample surface may be conducted in a liquid environment by immersing the tip portion of the probe in the liquid.

15. A scanning type near field interatomic force microscope comprising: a hook-shaped probe formed of a light transmitting material and having a sharpened tip portion with a transmitting hole for transmitting light and an elongated shaft portion extending at an angle with respect to the tip portion, the tip portion of the probe being disposed over and movable relative to a sample surface for simultaneously measuring the shape of the surface of the sample and the optical characteristics of a minute region of the surface of the sample by scanning the probe tip relative to the surface of the sample while maintaining the distance between the tip portion of the probe and the surface of the sample within a range in which an interatomic force acts between the tip portion of the probe and the surface of the sample; a piezoelectric substance integrally formed with the probe and having electrodes thereon; oscillating means for oscillating the piezoelectric substance at a resonance frequency thereof in a direction perpendicular to the surface plane of the sample; detection means for detecting a change in resonance characteristics of the piezoelectric substance caused by the interatomic force acting between the tip portion of the probe and the surface of the sample as a change in electrical characteristics of the piezoelectric substance; control means for maintaining a constant distance between the tip portion of the probe and the surface of the sample on the basis of a detection signal output from the detection means; and a lyophobic ring sheet for holding a drop of liquid on the sample surface such that measurement of the sample surface may be conducted by immersing the tip portion of the probe in the drop of liquid; wherein the probe has a shaft attached to a side surface of the piezoelectric substance such that the tip portion of the probe extends in the direction of oscillation of the piezoelectric substance.

16. A scanning type near field interatomic force microscope as claimed in claim 15; wherein the oscillating means comprises a drive circuit for generating an AC drive signal for electrically driving the piezoelectric substance, the detection means includes means for detecting through the electrodes current change in the AC drive signal which is caused by the interatomic force, and the detection means includes means for outputting a detection signal for maintaining the distance between the tip portion of the probe and the surface of the sample constant.

17. A scanning type near field interatomic force microscope as claimed in claim 15; wherein the oscillating means comprises a bimorph for oscillating the piezoelectric substance in response to an externally supplied signal, the detection means includes means for detecting through the electrodes a change in an electric charge of the piezoelectric substance in response to oscillation of the piezoelectric substance and the interatomic force, and the detection means includes means for outputting a detection signal for maintaining the distance between the tip portion of the probe and the surface of the sample constant.

18. A scanning type near field interatomic force microscope as claimed in claim 15; wherein the detection means comprises means for controlling the frequency of an oscillating signal of the oscillating means to follow a resonance frequency of the piezoelectric substance by comparing a phase of the oscillating signal to a phase of an electrical signal detected through the electrodes of the piezoelectric substance, the detection means includes means for outputting the detection signal by detecting the change of a resonance frequency caused by the action of the interatomic force, and the control means includes means for controlling the resonance frequency of the piezoelectric substance to be constant so that the distance between the tip portion of the probe and the surface of the sample is kept constant.

19. A scanning type near field interatomic force microscope as claimed in claim 15; further comprising a sample container enclosing the sample and holding a liquid such that measurement of the surface of the sample may be conducted in a liquid environment in a state where the tip portion of the probe is immersed in the liquid.

20. A scanning type near field interatomic force microscope as claimed in claim 15; wherein the piezoelectric substance comprises a tuning fork type quartz oscillator, the probe is formed integrally with one arm of the tuning fork type quartz oscillator, and a balance weight for balancing against the probe is formed integrally with the other arm.

21. A scanning type near field interatomic force microscope comprising: a probe formed of a light transmitting material and having a sharpened tip portion with a transmitting hole for transmitting light, the probe being disposed over and movable relative to a sample surface for simultaneously measuring the shape of the surface of the sample and the optical characteristics of a minute region of the surface of the sample by scanning the probe tip relative to the surface of the sample while maintaining the distance between the tip portion of the probe and the surface of the sample within a range in which an interatomic force acts between the tip portion of the probe and the surface of the sample; a piezoelectric substance formed integrally with the probe and having electrodes; oscillating means for oscillating the piezoelectric substance at a resonance frequency thereof in a direction which is either substantially parallel or substantially perpendicular with respect to the surface plane of the sample; detection means for detecting a change in resonance characteristics of the piezoelectric substance caused by the interatomic force acting between the tip portion of the probe and the sample as a change in electrical characteristics of the piezoelectric substance; control means for maintaining a constant distance between the tip portion of the probe and the surface of the sample based on a detection signal output by the detection means; and a cover for covering the probe and a top and a side surface of the piezoelectric substance such that measurement of the surface of the sample may be conducted in a liquid environment in a state in which the tip portion of the probe and the sample surface are immersed in a liquid and the piezoelectric substance is disposed outside the liquid; wherein the piezoelectric substance comprises a tuning fork type quartz oscillator, the probe is attached to one arm of the tuning fork type quartz oscillator, and a balance weight for balancing against the probe is attached to the other arm.

22. A scanning type near field interatomic force microscope as claimed in claim 21; wherein the tip portion of the probe is hook-shaped and the piezoelectric substance oscillates in a direction perpendicularly to a surface plane of the sample.

* * * * *